2,796,447

HYDROGENOLYSIS OF DIALDEHYDE STARCH TO ERYTHRITOL AND ETHYLENE GLYCOL

John W. Sloan and Ivan A. Wolff, Peoria, Ill., assignors to the United States of America as represented by the Secretary of Agriculture No Drawing. Application March 25, 1955,
Serial No. 496,958

3 Claims. (Cl. 260—635)

(Granted under Title 35, U. S. Code (1952), sec. 266)

A non-exclusive, irrevocable, royalty-free license in the invention herein described, for all governmental purposes, with power to grant sublicenses for such purposes, is hereby granted to the Government of the United States of America.

This invention relates to a method for making polyols from a compound having the following formula

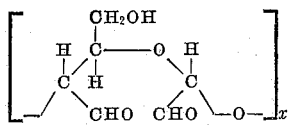

in which $x$ represents the number of repeating units in the molecule and may range from as low as 10 to many thousand. The terminal groups of the molecules each contain a hydrogen atom attached to the free terminal bond of the group.

The value of $x$ in any one instance will depend both upon the particular substance as it existed prior to the introduction of the aldehyde (—CHO) groups and upon the extent of depolymerization or degradation resulting from prior treatments the substance has undergone, as for example the oxidation process. The prior substance is, in any event, a starch material. The compound of the formula is an oxidation derivative of starch, and the value of $x$ is the degree of polymerization of the derivative.

The invention relates in particular to a method for producing erythritol by the simultaneous reduction and hydrolysis of the above compound. The chemical conversion involved in the process also results in the production of another valuable product, namely, ethylene glycol.

The compound of the formula is well known to carbohydrate chemists. It has been variously termed in the literature, and has frequently been designated as "dialdehyde starch." One of the best known methods for making it is through the oxidation of starch with periodic acid or its salts. It has hence frequently been termed "periodate oxidized starch."

One method for its production is described by Dvonch and Mehltretter, J. A. C. S. 74, 5522 (1952), and in U. S. Patent No. 2,648,629. The method involves the electrolytic production of periodate in situ as needed during the oxidation.

Periodate oxidized starch has been reduced prior to our work to a polyol either catalytically or by means of sodium borohydride. The resulting polyomeric polyol, in turn has been hydrolyzed in mineral acid solution to give erythritol. This prior technology, while providing a method for producing erythritol is, nevertheless, tedious and expensive. Moreover, it is technologically difficult to accomplish, and by its nature would be expected to give lower yields of erythritol than the process we describe here. The nature of the two-step process mentioned is such as to produce considerable quantities of low molecular weight aldehydes such as glycollic aldehyde which could condense with erythritol to form acetals or similar compounds undesirable from the standpoint of lowered erythritol yield and more complicated recovery procedures. As a consequence, periodate starch has not heretofore been regarded as a potential source material for practical quanties of erythritol.

Erythritol is a polyol of similar structure to glycerol and sorbitol, and it has many uses as a humectant, as a base material for the preparation of non-ionic surface active agents, and as a plasticizer. It is also a potentially useful raw material in the preparation of artificial drying oils. When esterified with unsaturated fatty acids, it should be particularly useful in the latter field.

We have found that when the above compound, which we shall term "dialdehyde starch" for the sake of convenience, is subjected in solution or suspension to catalytic reduction, a simultaneous hydrogenation of the aldehyde groups, hydrolysis of the polymer and subsequent hydrogenation of the newly formed aldehyde groups is achieved. This results in the direct formation of erythritol and ethylene glycol, and is accomplished moreover without the addition of any acidic material or catalyst other than the conventional hydrogenation catalyst. We have found, in fact, that the presence of certain other materials in addition to the hydrogenation catalyst results in reduction of erythritol yield. For example, materials normally expected to assist in the hydrolysis such as ion exchange resins, formate salts, formate esters and ionic wetting agents depress the yield of erythritol.

Our discovery is based upon the use of a certain critical range of temperatures, considerably higher than the minimum required for catalytic reduction of the original aldehyde groups.

As previously mentioned, the process of the present invention results in the production of a second useful product, namely ethylene glycol, derived from the 2-carbon fragment of the polymer. The magnitude of the yields of ethylene glycol and erythritol have been found to parallel one another. That is to say, those conditions which are conducive to a high yield of erythritol are likewise conducive for ethylene glycol.

The temperature of reaction appears to dictate the course of the reaction, and must be kept within the range of 150° to 230° C. For best results we prefer to employ temperatures of 180° to 200° C.

Other conditions of the reaction are not critical provided the conventional conditions of catalytic hydrogenation are maintained. For example, the pressure employed may vary over a wide range, consideration being given the usual interdependence between type of catalyst and the pressure required. For example, the minimum operative pressures for base metal catalyst such as Raney nickel and copper chromite are somewhat higher than those for noble metal catalysts such as supported platinum or palladium.

The time of reaction may also vary over a wide range. It is dependent somewhat on temperature in the usual inverse relationship. At temperatures within the high part of the designated range, less time is required. The top limit of reaction time for practical purposes may be considered as 12 hours; the lower limit may depend partly on the activity of the catalyst as well as on temperature and in case of a continuous process would preferably be less than one hour.

The pH of the reaction medium may vary from slightly alkaline (pH 8–9) to slightly acid (pH 4–5), but preferred procedure is to begin with the natural pH of the starting solution, i. e., near neutrality, and permit the pH to fall gradually as the reaction proceeds. It usually has a value of 5–6 at the end of the reaction. Buffer material or small amounts of alkali may be added to maintain the pH above 6 during the reaction, but we have not found this necessary.

The reaction is carried out by subjecting an aqueous suspension or solution of the dialdehyde starch to catalytic hydrogenation. For reasons of convenience we employ Raney nickel, suspending a small amount in the mixture prior to hydrogenation. The reaction is carried out in a pressure vessel, which is brought to reaction temperature by internal or external heating means. Gaseous hydrogen is introduced in an amount at least sufficient to effect the theoretical molecular transformation of the six-carbon units of the dialdehyde starch molecule into erythritol and ethylene glycol.

Reaction temperature is maintained while agitating the reaction mixture, for a period of 1 to 12 hours. The products are recovered by separating the catalyst from the solution and recovering erythritol and ethylene glycol by known methods. The former may be separated by evaporation and crystallization and the latter by fractional distillation of the mother liquor.

The following specific examples illustrate the invention.

EXAMPLE I

The dialdehyde cornstarch, prepared in accordance with the method of Dvonch and Mehltretter, previously noted, was found analytically to be comprised of dialdehyde units of the type shown in the above formula to the extent of 94 to 100%. The Raney nickel catalyst was prepared according to Pavlic and Adkins, J. Am. Chem. Soc. 68, 1471 (1946).

To 46 ml. of a 2% suspension of the dialdehyde cornstarch in a stainless steel bomb was added 1 ml. of moist catalyst. Hydrogen was admitted to 1700 to 2000 p. s. i., and the bomb held in a shaker at the designated temperature for the designated time. At the end of the reaction time, the product was recovered by filtering off the catalyst, washing it with boiling water and combining filtrate and washings.

For the purpose of this example erythritol was determined by the following assay procedure:

The solution, of known volume, as quantitatively spotted on a paper chromatogram and irrigated with butanol-pyridine-water (6:4:3) mixture to separate the components of the product. The erythritol spot was located by spraying a parallel guide strip with ammonical silver nitrate reagent and then eluted with water. An aliquot of the aqueous eluate was then oxidized with periodate and the resulting formaldehyde (proportional to the original erythritol) determined by the chromotropic acid color reaction of Lambert and Neish, Can. Jour, Research, B–28, 83 (1950). This determined the amount of erythritol in the final solution and permitted calculation of yield of erythritol from starting material.

Some of the products were modified by an additional step of acid hydrolysis for purposes of comparison. Hydrolysis was carried out using 1 N $H_2SO_4$ on a steam bath for 7 to 8 hours. The erythritol was demonstrated as above after precipitation of the sulfate as its barium salt and removal by filtration.

The results are tabulated below.

Table I

| Run No. | Reaction Time, Hours | Reaction Temp., °C. | Erythritol, Percent Theory | Remarks |
| --- | --- | --- | --- | --- |
| 1 | 20 | 25 | nil | 75%—CHO remaining. |
| 2 | 2 | 100 | 8 | Slight red. power. |
| 3 | 2 | 170 | 40 | pH of product, 5.1. |
| 4 | 2 | 200 | 71 | pH 5.0. |
| 5 | 12 | 200 | 62 | pH 6.8. |
| 6 | 6 | 200 | 54 | |
| 7 | 6 | 220 | 43 | Starting-line spot; pH 5.0. |
| 8 | 6 | 250 | 4 | Start 1,200 p. s. i.; pH 4.4. |

All products gave a negative reducing power test (Benedict's qualitative) except Nos. 1 and 2. The product of run No. 6 was treated with 1 N $H_2SO_4$ on a steam bath for 7 to 8 hours to determine if the yield of erythritol could be increased by hydrolysis of the mixture. Erythritol recovery was increased only 1 percent over the 54 percent yield of the untreated product. The product of other representative runs gave similar results.

EXAMPLE II

This example illustrates the adverse effect of excess initial alkalinity in the reaction mixture. Example I was repeated, except that the initial pH of the reaction mixture was adjusted to 10.8 by the addition of NaOH solution. The reaction temperature was 200° C. and the time was 6 hours. The pH of the final reaction mixture was 6.5. Erythritol yield was 23% of theory.

In carrying out the process of the invention on a larger scale, lower hydrogen pressures may of course be used. The reaction mixture, upon completion of the combined hydrogenation-hydrolysis may be evaporated to recover erythritol by crystallization, or the latter may be precipitated by organic non-solvents for erythritol such as ethanol or ethanol-heptane mixtures in which the erythritol is sparingly soluble and the other components very soluble.

In the foregoing examples, representative samples of the products were treated by the latter method, i. e., a mixture of ethanol and a small proportion of heptane. The precipitated crystals of erythritol were purified by recrystallization, and had a melting point of 121° C. Mixed with a known sample of erythritol having a melting point of 121° C., the mixture showed no depression of melting point. The tetrabenzoate of the purified product melted at 188° C.

We claim:
1. The method of producing a mixture comprising erythritol and ethylene glycol which comprises subjecting an aqueous reaction mixture comprising dialdehyde starch to hydrogen under superatmospheric pressure in the presence of a hydrogenation catalyst at a temperature within the range of 150° to 230° C., maintaining said conditions of temperature and pressure for a period of 1 to 12 hours, and separating the reaction product comprising erythritol and ethylene glycol from said catalyst.

2. The method comprising subjecting dialdehyde starch to hydrogen under superatmospheric pressure in the presence of a hydrogenation catalyst at a temperature within the range of 150° to 230° C., maintaining said conditions of temperature and pressure for a period of 1 to 12 hours, separating catalyst from the reaction mixture, and recovering erythritol from said separated reaction mixture.

3. The method of claim 2 in which the temperature is maintained in the range of 180° to 200° C. during the reaction.

References Cited in the file of this patent

UNITED STATES PATENTS

| 2,518,235 | Harstra et al. | Aug. 8, 1950 |
| 2,609,398 | Lolkema et al. | Sept. 2, 1952 |
| 2,609,399 | Kool et al. | Sept. 2, 1952 |

OTHER REFERENCES

Jackson et al.; J. A. C. S., vol. 60 (1938), pp. 989–90.
Abdel-Akher et al.; J. A. C. S., vol. 74 (1952), pp. 4970–71.
Abdel-Akher et al.; Nature, vol. 171 (1953), pp. 474–5.
Sloan et al.; J. A. C. S., vol. 76 (1954), pp. 4429–34.
Jeanes et al.; J. Org. Chem., vol. 20 (1955), pp. 1565–8.